(12) United States Patent
Phely

(10) Patent No.: US 6,371,579 B1
(45) Date of Patent: Apr. 16, 2002

(54) WHEELS FOR TRACKS

(75) Inventor: Olivier Phely, Sainte Colombe (FR)

(73) Assignee: Otico, Longueville (FR)

( * ) Notice: Subject to any disclaimer, the term of this patent is extended or adjusted under 35 U.S.C. 154(b) by 0 days.

(21) Appl. No.: 09/547,224

(22) Filed: Apr. 11, 2000

(30) Foreign Application Priority Data

Apr. 15, 1999 (FR) .............................................. 99 04741

(51) Int. Cl.[7] .............................................. B62D 55/12
(52) U.S. Cl. ...................................... 305/115; 305/199
(58) Field of Search ................................ 305/100, 115, 305/136, 137, 184, 195, 199

(56) References Cited

U.S. PATENT DOCUMENTS

| | | | | |
|---|---|---|---|---|
| 1,922,357 A | * | 8/1933 | Diviney et al. | 305/115 X |
| 3,155,436 A | * | 11/1964 | Bonmartini | 305/115 |
| 3,486,574 A | * | 12/1969 | Baron | 305/115 X |
| 4,687,261 A | * | 8/1987 | Atkin | 305/199 |
| 4,856,853 A | * | 8/1989 | Bayoumi | 305/115 |
| 5,484,321 A | * | 1/1996 | Ishimoto | 305/195 X |
| 5,758,932 A | * | 6/1998 | Klopfenstein et al. | 305/115 X |
| 5,769,512 A | * | 6/1998 | Kautsch | 305/115 X |
| 6,068,353 A | * | 5/2000 | Juncker et al. | 305/195 X |

FOREIGN PATENT DOCUMENTS

| | | | |
|---|---|---|---|
| EP | 0512467 | 11/1992 | |
| EP | 0831017 | 3/1998 | |
| JP | 55-94866 | * 7/1980 | 305/199 |

* cited by examiner

*Primary Examiner*—Russell D. Stormer
(74) *Attorney, Agent, or Firm*—Dennison, Scheiner & Schultz

(57) ABSTRACT

The invention concerns a wheel for a flexible track comprising two rolling paths (36) surrounding an intermediate zone (50), in particular a drive zone. At least one of the rolling paths has a multiplicity of cavities (200) of selected form opening radially towards the outside of the wheel and laterally towards the edge of the wheel so as to promote lateral evacuation of any material object liable to be caught between the wheel and the flexible track. The wheel is generally used for all-terrain vehicles.

9 Claims, 3 Drawing Sheets

WHEELS FOR TRACKS

BACKGROUND OF THE INVENTION

The invention concerns track drives intended in particular for propelling all-terrain vehicles such as agricultural, vineyard and oyster-farming tractors or civil engineering and forestry equipment.

In its patent FR-A-2,711,959 (93 13 211), the applicant proposed particularly advantageous modifications for track drives. One essential idea is to provide as a track an endless flexible belt, preferably of a reinforced elastomer material. The track is fitted on the inside with at least one row of lugs arranged in the longitudinal direction of the belt, spaced at a constant pitch and each delimited by two transverse faces forming an angle of between 30° and 40° in relation to a plane normal to the track belt, and a drive wheel on which the track is wound, and fitted with drive means able to co-operate with the lugs.

Thus a drive wheel comprises a drive zone, generally next to its median plane and perpendicular to its axis of rotation, forming a gear for driving the lugs, with, on either side, rolling support zones for the track known as roll paths. The same applies at least to certain idler wheels which co-operate with the track, except of course for the drive gear function. The roll paths play a significant role in supporting the track and where applicable maintaining it on its drive.

A problem arises when stones, pieces of wood, sand, gravel or other similar foreign bodies become enmeshed between the track and a wheel, in particular but not exclusively a drive wheel. In fact a considerable mechanical "overload" on the track can result, often with effects tending to puncture the track and damage its structure.

These effects are relatively poorly known and depend on the shape and number of the foreign bodies thus introduced at a given moment for a given track, their mechanical characteristics and their positional distribution.

The applicant has used wheel scrapers to limit the number of foreign bodies thus present. But this solution has not given complete satisfaction.

The purpose of the present invention is to improve the situation.

SUMMARY OF THE INVENTION

The invention comprises a wheel for a flexible track comprising two rolling support zones surrounding a drive zone.

According to a general aspect of the invention, a rolling track comprises a multiplicity of cavities of selected form opening radially towards the outside of the wheel and laterally towards the edge of the wheel so as to promote lateral evacuation of any material or object liable to be caught between the wheel and the track.

The applicant has in fact found that it is possible and even favorable to reduce the active surface of the rolling zones by providing cavities which, in combination with the movement of the wheel, allow considerable limitation of the accumulation of debris between the wheel and the track. The track positioning and its running smoothness are not affected significantly.

In general the rolling paths are of circular cylindrical shape. The cavities form recesses with angular spacing, preferably regular, at least statistically.

In one embodiment the rolling paths are defined by flanks on either side of the core of the wheel (central plane). The cavities are arranged in the outer face of these flanks. The invention also covers the combination of a track, in particular the endless belt type, with at least one wheel as defined above, and also any vehicle fitted with at least such a combination of means (in principle two).

BRIEF DESCRIPTION OF THE DRAWINGS

Other characteristics and advantages of the invention may become apparent from examination of the description which follows, given as an example, and the attached drawings in which.

DETAILED DESCRIPTION OF THE ILLUSTRATED EMBODIMENTS

For the description of the track and vehicle drives, reference may be made to the French patent 2,711,959.

Taking into account the nature of the invention it is also clear that the drawings can contribute to the definition of the invention where applicable.

Figure 1:
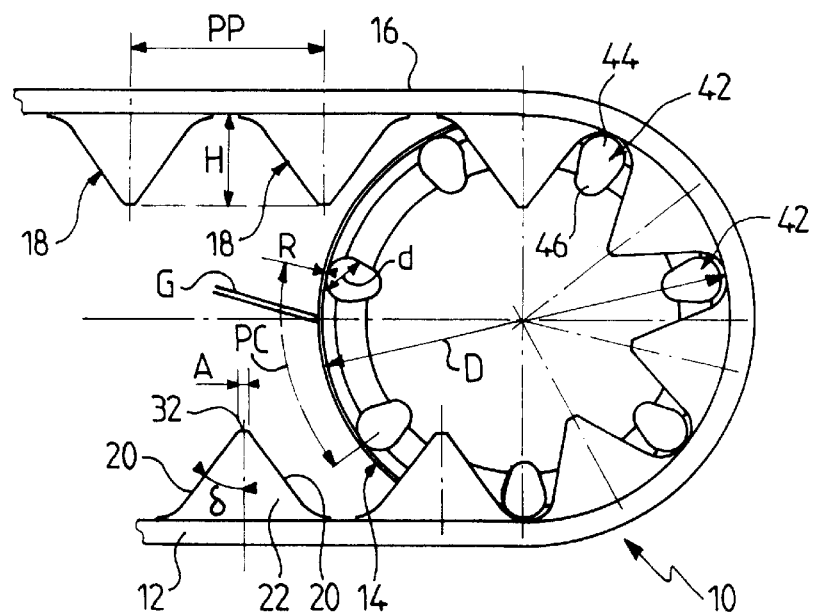
FIG. 1 is a partial cross section side view of a drive device for the flexible track.

FIG. 1 shows a drive device for a flexible track 10 rolling about a drive wheel 14. The track 10 is made of a flexible endless belt 12 advantageously made of elastomer material, for example based on natural rubber, reinforced on the inside by reinforcements not shown, and obtained in a manner known in itself by the superposition of layers of warp and weft material comprising metal or synthetic threads. The endless belt 12 has on the outside a rolling surface 16. On the inside it is fitted with a row of lugs 18 arranged in the longitudinal direction of the belt and in principle equidistant.

In the embodiment described, the row of lugs 18 is situated between two rolling track support surfaces in the form of a cushion made of extra thickness inside the endless belt 12.

The drive wheel 14 is in principle made of metal material, advantageously cast iron or aluminum. It also has two annular rolling surfaces 36 able to hold the two rolling track support surfaces. These two rolling surfaces 36 each have an extension 40 extending radially towards the inside of the wheel. The extensions 40 are parallel with the side faces 22 of the lugs and with the latter delimit a mean lateral play of limited value which is advantageously between 4 and 8 millimeters.

The two rims 38 are connected together at regular intervals by drive catches 42 which define a "core" of the wheel in its central symmetrical plane perpendicular to the axis of rotation. These catches are arranged parallel to each other at the edge of the wheel and parallel to the generatrices of the latter. They are spaced at the periphery of drive wheel 14 by a circumferential pitch, the value of which is between 93% and 100% of value PP of the pitch of lugs 18 which have height H. As is shown on FIG. 1, each of the catches has a generally ovoid form with a bulging end 44 of wider section directed towards the outside and a narrower end 46 of smaller section directed towards the inside of the wheel. The bulging end 44 has a diameter d of at least 25 millimeters (FIG. 1). The catches 42 are intended to engage in the empty spaces delimited between the lugs 18. Their form narrowing towards the inside facilitates engagement and disengagement of the lugs during their enmeshing and release with the drive wheel.

The external diameter of wheel 14 is designated by D. In a lower range, H=50 to 70 millimeters, D minimum 250 to 300 millimeters and PP 110 to 135 millimeters. In an upper range H=70 to 90 millimeters, D minimum 300 to 550 millimeters and PP=120 to 155 millimeters.

At the catches 42 the wheel has an intermediate zone 50 which may or may not serve as a drive depending on whether it is a drive or idler wheel.

The catches 42 are arranged recessed towards the inside of the wheel in relation to rolling surfaces 36. This recessing, which for example may be of the order of 2 millimeters, is intended to facilitate in particular the release of debris (soil, pebbles, straw etc.) which becomes lodged between the track and the drive wheel.

But as specified above, it has been found that this measure is not always sufficient. The addition of scrapers for example as shown diagrammatically by G is itself no more adequate.

The applicant has then found that the provision of suitably shaped cavities improves matters considerably without degrading the mechanical properties of the wheel (drive or idler). In principle these cavities are inclined radially towards the inside of the wheel in the direction towards an external side face of the wheel.

We have seen that the rolling surfaces of the wheel have a circular cylindrical shape. Embodiments will now be described in which the cavities are formed by recesses with angular spacing. More specifically the cavities are each delimited by a base wall inclined in the direction of the edge of the wheel.

Figure 2:
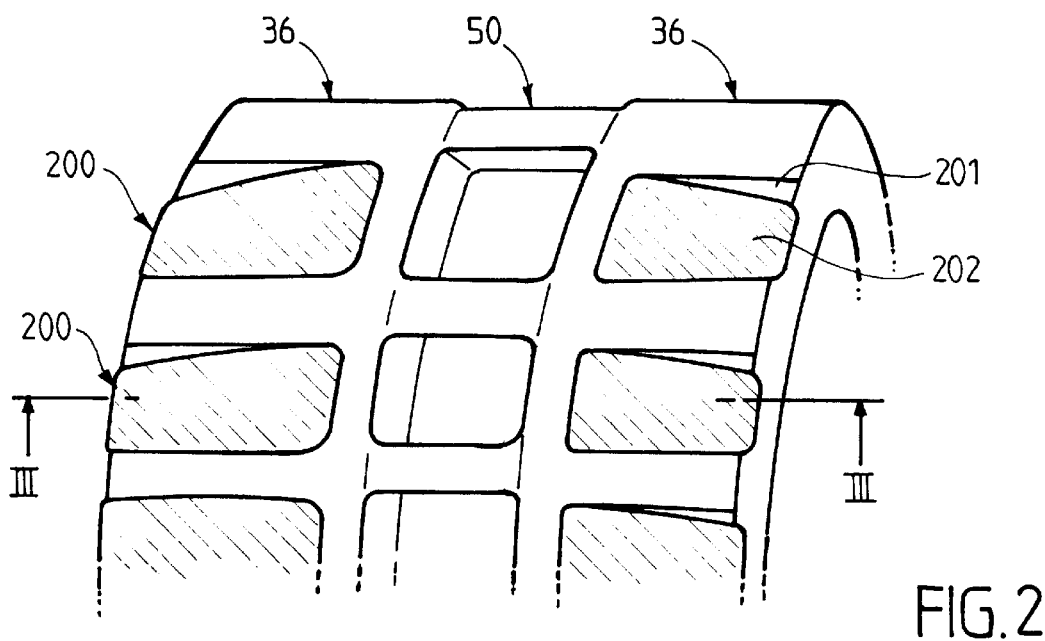
FIGS. 2 and 3 show in perspective and partial peripheral section a first embodiment of a wheel according to the invention.
Figure 3:
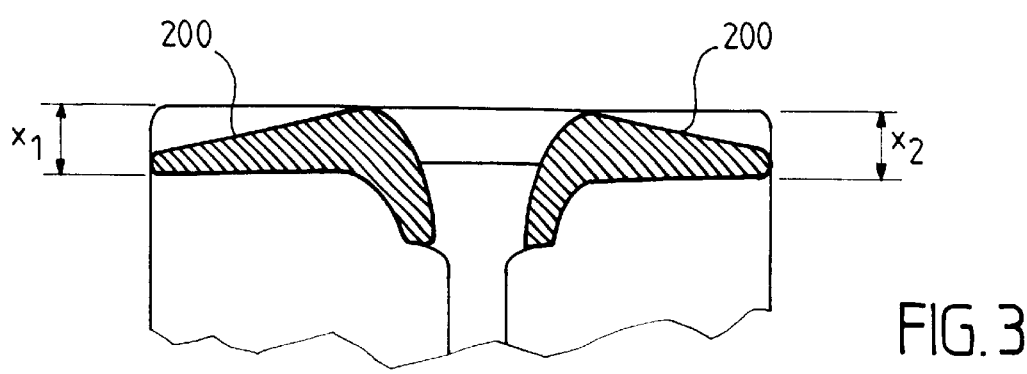

Referring to FIGS. 2 and 3, cavities 200 have an approximately rectangular contour viewed from the rolling surfaces. Their limit edges 201 are approximately radial. As cross section view III—III of FIG. 3 shows, base 202 descends radially towards the outside of the wheel. In other words the periphery of the rim narrows progressively towards the outside at the level of cavities 200.

Figure 4:
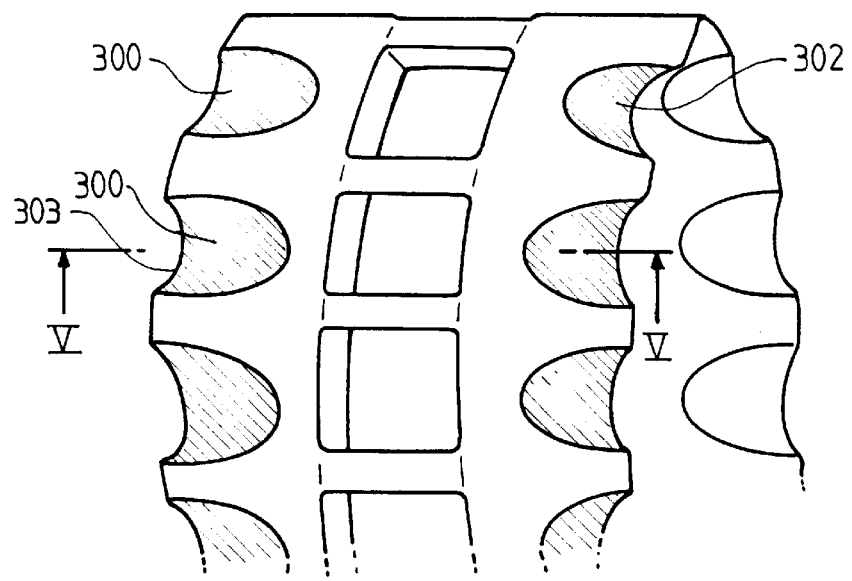
FIGS. 4 and 5 show in perspective and partial peripheral cross section a second embodiment of a wheel according to the invention.
Figure 5:
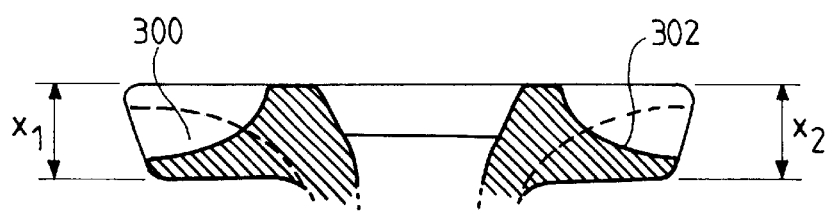

On FIGS. 4 and 5 (section V—V), cavities 300 are shell-shaped or concave "ungulate". As or before, base 302 descends radially towards the outside of the wheel, the periphery of the rim thinning progressively towards the outside at the level of cavities 300. Note the arched "crescent" shape 303 of the free edge of the cavity which also has a more pronounced slope here, at least in part.

Figure 6:
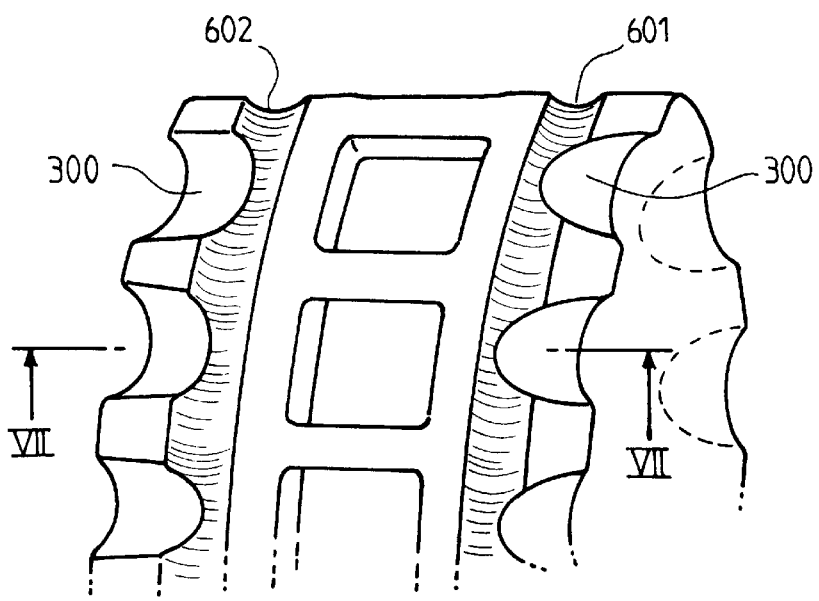
FIGS. 6 and 7 show in perspective and partial peripheral cross section a third embodiment of a wheel according to the invention.
Figure 7:
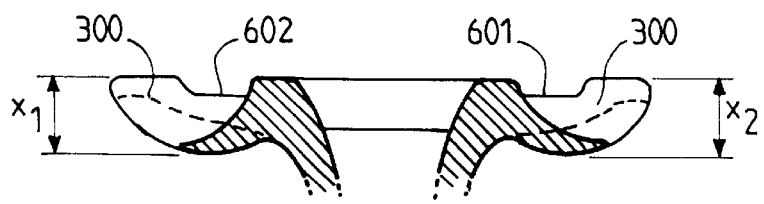

The embodiment in FIGS. 6 and 7 (section VII—VII) is similar to that of FIGS. 4 and 5 but with the addition in each of the rolling paths of an annular duct 601, 602 located at a distance from the corresponding edge of the wheel and into which open cavities 300. The base of the duct advantageously has a straight section in an arc or similar. Such a duct can also be provided in other embodiments in particular those in FIGS. 2 and 3.

We will now describe other versions where each of the rolling paths is defined at least partly by lugs projecting from an annular base of cylindrical or tapered shape, forming communicating inter-lug regions.

Figure 8:
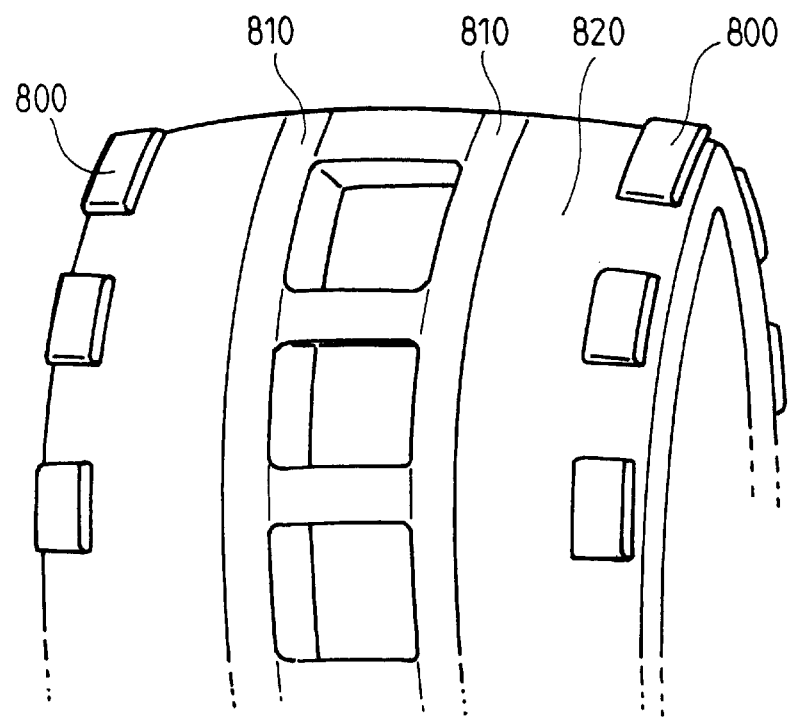
FIG. 8 shows in partial peripheral perspective a fourth embodiment of a wheel according to the invention.

Referring to FIG. 8, each of the rolling paths is defined by a plurality of projecting lugs 800 spaced apart and disposed close to the outer edge of the wheel on base 820. A cylindrical annular strip 810 is provided preferably in a central region of the wheel. Base 820 of the rolling path is concave, and descends radially towards the inside in the direction of the outside of the wheel as before with a straight radial section of cylindrical or tapered shape.

Figure 9:
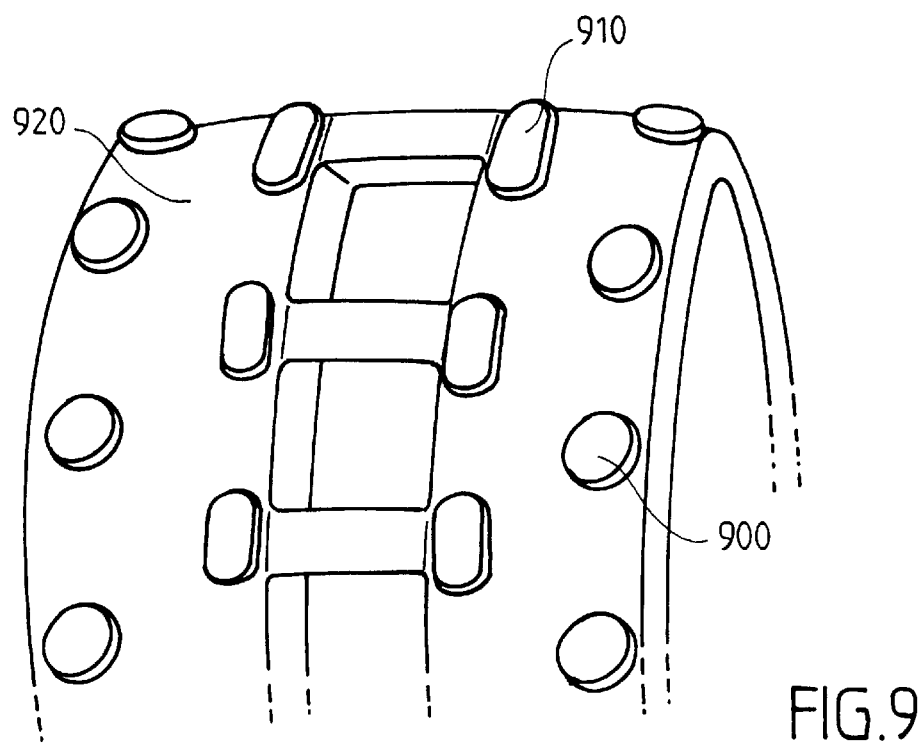
FIG. 9 shows in partial peripheral perspective a fifth embodiment of a wheel according to the invention.

Referring to FIG. 9 which can be compared with FIG. 8 the lugs 900 are preferably smaller while the annular strip 810 is replaced by another row of lugs 910. In other words each of the rolling paths is defined by a first series of projecting lugs spaced apart and situated close to the outer edge of the wheel and by a second series of projecting lugs spaced apart and situated in a central zone of the wheel (close to the drive track).

It is preferable to retain the scrapers such as G (FIG. 1). However these lose their importance and could be eliminated in certain cases.

Naturally various other variants can be provided. For example cavities can be provided only on one of the two rolling surfaces, for example the outer surface in relation to the vehicle, at least in certain cases. The inter-lug regions are not necessarily spaced regularly on the periphery of the wheel provided that the mechanical constraints of rolling are observed.

Spatial constraints (housing the drive for example) may apply on the side of the wheel facing the vehicle. Thus thickness x1 of the periphery of the rim on the vehicle side may be thinner than thickness x2 of the periphery of the rim on the outside (FIGS. 3, 5 and 7 in particular). In this case the cavities will not be exactly the same on both sides. On FIG. 5 for example the crescents 303 will be more curved and closer to the central plane of the wheel on the inside than on the outside.

More generally the rolling surface or surfaces can have a different layout from that described in detail. Finally although the invention is of particular benefit for a drive wheel of the type described it can also be applied to a non-drive wheel which must have similar rolling surfaces to those on the drive wheels; it could also be applied to drive wheels of different principle.

What is claimed is:

1. A wheel for a flexible track, said wheel comprising first and second rolling paths surrounding an intermediate zone, wherein at least one of the first and second rolling paths comprises a plurality of cavities of selected form having at least one surface extending to the edge of the wheel and directed radially towards the outside of the wheel and laterally towards the edge of the wheel so as to promote lateral evacuation of material coming between the track and the wheel and, wherein the rolling paths are of substantially circular cylindrical form and wherein the cavities are formed by recesses with angular spacing.

2. A wheel according to claim 1, wherein said at least one surface comprises a base wall.

3. A wheel according to claim 1, wherein the cavities have an approximately rectangular shape.

4. A wheel according to claim 1, wherein the cavities are concave and have an elliptical circumference.

5. A wheel according to claim 1 wherein each of the rolling paths includes an annular duct situated at a distance from an edge of the wheel and into which the cavities open.

6. A wheel according to claim 1, wherein said wheel is made of cast iron or aluminum.

7. A wheel for a flexible track, said wheel comprising first and second rolling paths surrounding an intermediate zone, wherein at least one of the first and second rolling paths comprises a plurality of projecting studs and a surface directed radially towards the outside of the wheel and laterally towards the edge of the wheel so as to promote lateral evacuation of material coming between the track and the wheel.

8. A wheel according to claim 7, wherein each of the first and second rolling paths is defined by projecting lugs spaced apart and situated close to the corresponding edge of the wheel and by a cylindrical annular strip situated in a central zone.

9. A wheel according to claim 7, wherein each of the first and second rolling paths is defined by a first series of projecting lugs spaced apart and situated close to the corresponding edge of the wheel and by a second series of lugs spaced apart and situated in a central zone of the wheel.

* * * * *